(12) United States Patent
Falk

(10) Patent No.: US 11,556,660 B2
(45) Date of Patent: Jan. 17, 2023

(54) METHOD AND APPARATUS FOR ERASING SECURITY-RELEVANT INFORMATION IN A DEVICE

(71) Applicant: SIEMENS AKTIENGESELLSCHAFT, Munich (DE)

(72) Inventor: Rainer Falk, Poing (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 404 days.

(21) Appl. No.: 16/096,706

(22) PCT Filed: Apr. 13, 2017

(86) PCT No.: PCT/EP2017/058924
§ 371 (c)(1),
(2) Date: Oct. 26, 2018

(87) PCT Pub. No.: WO2017/186506
PCT Pub. Date: Nov. 2, 2017

(65) Prior Publication Data
US 2020/0327242 A1    Oct. 15, 2020

(30) Foreign Application Priority Data

Apr. 28, 2016 (DE) ..................... 10 2016 207 238.2

(51) Int. Cl.
*H04W 12/02* (2009.01)
*G06F 21/60* (2013.01)
(Continued)

(52) U.S. Cl.
CPC .......... *G06F 21/604* (2013.01); *H04W 12/02* (2013.01); *H04W 12/12* (2013.01); *H04W 12/68* (2021.01);
(Continued)

(58) Field of Classification Search
CPC ........ G06F 21/604; G06F 21/60; G06F 21/88; G06F 21/50; G06F 21/55; G06F 21/70;
(Continued)

(56) References Cited

U.S. PATENT DOCUMENTS 6,398,159 B1    6/2002    Di Stefano
8,615,612 B1    12/2013   Kostrzewski et al.
(Continued)

FOREIGN PATENT DOCUMENTS

CN    101627392    1/2010
CN    102084372    6/2011
(Continued)

OTHER PUBLICATIONS

Steinmann J.A. et.al.; "UAS Security: Encryption Key Negotiation for Partitioned Data"; 2016 Integrated Communications Navigation and Surveillance (ICNS) Conference Apr. 19-21, 2016; pp. 1 E4-1-1 E4-7.; 978-1-5090-2149-9/16/; 2016;.
PCT International Search Report and Written Opinion of International Searching Authority dated Jun. 13, 2017 corresponding to PCT International Application No. PCT/EP2017/058924 filed Apr. 13, 2017.

*Primary Examiner* — Shaqueal D Wade-Wright
(74) *Attorney, Agent, or Firm* — Schmeiser, Olsen & Watts LLP

(57) ABSTRACT

Provided is a method for erasing security-relevant information in a device, having the method steps of: ascertaining at least one movement parameter of the device over time, monitoring the ascertained movement parameters over time on the basis of at least one prescribed movement pattern, and triggering an erase process for the security-relevant information if the ascertained movement parameter over time is consistent with the at least one prescribed movement pattern. An apparatus and a computer program product for carrying out the method to ensure that security-relevant data (Continued)

of the device are erased reliably and completely even in the event of an accident or another unforeseen event is also provided.

13 Claims, 3 Drawing Sheets

(51) Int. Cl.
*H04W 12/68* (2021.01)
*H04W 12/12* (2021.01)
*G06F 21/88* (2013.01)

(52) U.S. Cl.
CPC ...... *G06F 21/88* (2013.01); *G06F 2221/2143* (2013.01)

(58) Field of Classification Search
CPC ........ G06F 2221/2143; H04W 12/005; H04W 12/00508; H04W 12/00503; H04W 12/02; H04W 12/08; H04W 12/0802; H04W 12/12; H04W 12/1205; H04W 12/1206; H04W 12/1208
See application file for complete search history.

(56) References Cited

U.S. PATENT DOCUMENTS

| | | | |
|---|---|---|---|
| 2006/0225142 A1* | 10/2006 | Moon | G06F 21/76 726/34 |
| 2009/0060194 A1 | 3/2009 | Mackey et al. | |
| 2009/0249460 A1 | 10/2009 | Fitzgerald et al. | |
| 2010/0058077 A1* | 3/2010 | Matsuda | G06F 21/78 713/194 |
| 2010/0235567 A1 | 9/2010 | Perroud et al. | |
| 2010/0249460 A1 | 9/2010 | Ostgard et al. | |
| 2014/0351950 A1 | 11/2014 | Sakemi et al. | |
| 2016/0059855 A1 | 3/2016 | Rebhan et al. | |
| 2016/0171864 A1* | 6/2016 | Ciaramelletti | A61B 5/6801 340/539.11 |
| 2018/0114417 A1* | 4/2018 | Kerber | G06F 21/31 |
| 2021/0199788 A1* | 7/2021 | Emadi | G01S 13/931 |

FOREIGN PATENT DOCUMENTS

| | | |
|---|---|---|
| CN | 203118074 U | 8/2013 |
| CN | 103581378 A | 2/2014 |
| CN | 203931496 U | 11/2014 |
| CN | 105046147 A | 11/2015 |
| CN | 105162976 A | 12/2015 |
| CN | 205179170 U | 4/2016 |
| CN | 105868652 A | 8/2016 |

* cited by examiner

METHOD AND APPARATUS FOR ERASING SECURITY-RELEVANT INFORMATION IN A DEVICE

CROSS-REFERENCE TO RELATED APPLICATIONS

This application claims priority to PCT Application No. PCT/EP2017/058924, having a filing date of Apr. 13, 2017, based off of German Application No. 10 2016 207 238.2, having a filing date of Apr. 28, 2016, the entire contents both of which are hereby incorporated by reference.

FIELD OF TECHNOLOGY

The following relates to an apparatus and a method for erasing security-relevant information, such as, for example, cryptographic keys contained in mobile devices or perhaps devices installed at fixed locations.

BACKGROUND

Mobile devices, such as, for example, robots, unmanned flying objects or autonomous vehicles, can store sensitive data. These sensitive data are preferably protected by cryptographic methods, which means that they can be read only by authorized entities and read in plain text. This requires cryptographic keys. Cryptographic keys of this kind are produced by means of a generic key, for example, and stored in a security module. Security-relevant information of this kind needs to be protected against access by unauthorized persons or against access by unauthorized apparatuses in order to prevent manipulation of often security-critical functions that use the security-critical information. Frequently, devices are officially licensed for operating a security-critical function only if a device provides statutory protective measures for security-relevant information.

By way of example, manipulation sensors, such as, for example, antidrilling films, housing switches or light sensors, are known that detect device manipulation or manipulation of a security module arranged in the device and initiate a key erase function.

However, manipulation sensors of this kind protect only against a direct physical attack on a security module of this kind.

US 2009/060194 A1 discloses a method for protecting integrated cryptographic processors. An operating profile is used to check whether the system is manipulated.

US 2006/225142 A1 describes a method and a system for triggering complete erasure of confidential data in an electrical device. To this end, the device is monitored by comparing diagnosis values with prescribed threshold values.

US 2014/351950 A1 describes a communication device that protects stored information when vibrations are detected.

U.S. Pat. No. 8,615,612 B1 describes a housing for a portable storage medium for protecting against influences from the outside, wherein the housing is equipped with an anti-manipulation protection feature.

US 2010/058077 A1 describes a manipulation-proof device that erases confidential information stored on the device in the event of manipulation.

US 2009/249460 A1 discloses a method and a system for changing the function of an electronic device in the event of unauthorized use.

US 2010/235567 A1 discloses an aircraft and a method for erasing data in which data are erased from a memory of the aircraft as soon as a predefined event occurs.

Increasingly, security-relevant information is used in mobile objects, for example for secure position finding and navigation for unmanned flying objects or autonomous vehicles. Also, key material is needed for various functions of the device or object, and therefore the volume of security-relevant data accumulates, which means that an erase process for security-relevant information needs to be initiated and in particular completed before mechanical destruction of the device, for example as a result of a crash, collision or shelling. Otherwise, there is the risk that sensitive data in the lost mobile object will become accessible to unauthorized parties. There is also the risk that manipulation sensors, also called tamperproof function, present on a lost mobile device or on a security module contained therein will no longer work correctly and will no longer be able to perform the requisite antimanipulation function.

SUMMARY

An aspect relates to a method and an apparatus that ensure that security-relevant data of the device are erased reliably and completely even in the event of an accident or other unforeseen event.

The method according to embodiments of the invention for erasing security relevant information in a device has the following method steps:
- ascertaining at least one movement parameter of the device over time,
- monitoring the ascertained movement parameters over time on the basis of at least one prescribed movement pattern, and
- triggering an erase process for the security-relevant information if the ascertained movement parameter over time is consistent with the at least one prescribed movement pattern.

In typical accident scenarios, mobile devices also have typical movement patterns. As such, a flying object, in the event of failure of the drive, goes into a dive typical of a crash or drops below a prescribed height above ground at a speed above a prescribed limit value. Applicable movement patterns are stored in the flying object as prescribed movement patterns. By monitoring the ascertained movement parameters, it is possible to detect an accident or destruction of the device with great certainty and to initiate the erasure of the security-relevant information before the device is destroyed. The erase process can therefore be completed before the device or the security module on which the security-relevant information is stored is destroyed. Therefore, there is a high probability of being able to ensure that security-relevant information is erased from the device and therefore no longer accessible even in the case of unforeseen events that lead to mechanical destruction of the device.

In an advantageous embodiment, the movement parameter ascertained is a position, a speed, an acceleration or an orientation of the device.

As such, it is possible, for example using the position statement, to monitor the height of the device above the ground and to trigger the erase process in the event of a drop below a minimum height or in the event of a maximum height being exceeded. In the same way, an accident or misbehavior of the device can be assumed as a result of a maximum acceleration being exceeded. As result of the acceleration being ascertained as a movement parameter, a manipulation can be detected and the erase process triggered even in the case of devices installed at fixed locations, for example.

In an advantageous embodiment, the erase process is triggered if the at least one movement parameter is consistent with the prescribed movement pattern at least for a prescribed period and/or with a predetermined accuracy.

This ensures that a brief or randomly occurring fluctuation in the ascertained movement parameter does not lead to premature or unnecessary erasure of the security-relevant information.

In an advantageous embodiment, the prescribed movement parameter is a movement trajectory of the device.

A movement trajectory refers to a space curve along which the device, for example the center of gravity of the device, moves. As result of the movement of the device being monitored in comparison with prescribed movement trajectories that denote inadmissible movement patterns or movement patterns typical of an accident, it is also possible to detect manipulative diversion of the device from the trajectory and, in the case of very security-critical devices, for this alone to trigger erasure of the security-relevant information.

In an advantageous embodiment, a prescribed movement pattern denotes a special mode of operation of the device.

If, by way of example, the recorded movement parameter is identical to the movement trajectory of a special mode of operation that denotes an emergency landing, an emergency stop or an evasion function for limiting the damage by an accident, for example, then the erase process can be initiated and completed in this case too.

In an advantageous embodiment, the movement parameter of a medium surrounding the device is ascertained.

By way of example, the flow rate of the air at the surface of a flying device or at a distance from a flying object can be ascertained and monitored and therefore a stall resulting in or denoting a crash can be detected and timely erasure of the security-relevant data can be triggered.

The apparatus according to embodiments of the invention for erasing security-relevant information in a device comprises a detection unit designed to ascertain at least one movement parameter of the device, a monitoring unit designed to monitor the ascertained movement parameters over time on the basis of at least one prescribed movement pattern, and an erasure unit designed to trigger an erase process for the security-relevant information if the ascertained movement parameter over time is consistent with the prescribed movement pattern.

The security-relevant information of an apparatus of this kind can therefore be erased with a high level of probability before actual mechanical destruction and therefore illegal ascertainment of this information after an unforeseen event can be prevented.

In an advantageous embodiment, the detection unit has at least one sensor, preferably an inertial sensor, an acceleration sensor, a magnetic field sensor or a position sensor, that ascertains the at least one movement parameter.

In an advantageous embodiment, the erasure unit is directly connectable to a security module storing security-relevant information.

A direct connection between erasure unit and a security module storing security-relevant information allows the delay between an erase process and the start of the actual erase process to be optimized. Similarly, the reliability of the triggering of the erase process is increased, since no connecting lines exist between erasure unit and security module that can be damaged in the event of an accident and can prevent reception of an erase signal in the erasure unit.

A device according to embodiments of the invention, which is a mobile device or a device installed at a fixed location, comprises a corresponding apparatus for erasing security-relevant information.

In particular mobile devices can be damaged by impact on a solid body or surface or by entry into another medium, for example water, without the antimanipulation measure that is present detecting this and triggering the erasure of the security-relevant information. Additionally, said sensors can reliably detect vibrations or abrupt changes of movement, which infer damage or perhaps illegal removal of the device in the case of devices installed at fixed locations. In both cases, erasure can be prompted based on this information.

In addition, an aspect relates to a computer program product (non-transitory computer readable storage medium having instructions, which when executed by a processor, perform actions) that is loadable directly into a memory of a digital computer and comprises program code portions suitable for performing the steps of the method. In addition, an aspect relates to a data storage medium storing the computer program product.

BRIEF DESCRIPTION

Some of the embodiments will be described in detail, with references to the following Figures, wherein like designations denote like members, wherein.

Parts corresponding to one another are provided with the same reference signs throughout the figures.

DETAILED DESCRIPTION

A multiplicity of devices having microprocessors, such as, for example, computers, but also robots, flying objects, vehicles or perhaps field devices in automation installations, use cryptographic methods in order to communicate with communication partners in manipulation-proof fashion and/or, by way of example, to be able to use a radio navigation application with trustworthy and manipulation-proof signals. To this end, security-relevant information, such as, for example, cryptographic keys used in the cryptographic methods, are stored in the applicable device or in a specific apparatus arranged in the device.

Figure 1:
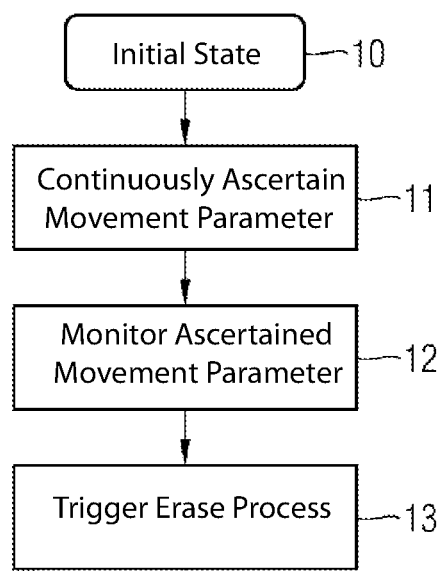
FIG. 1 shows a general exemplary embodiment of a method as a flowchart.
Figure 5:
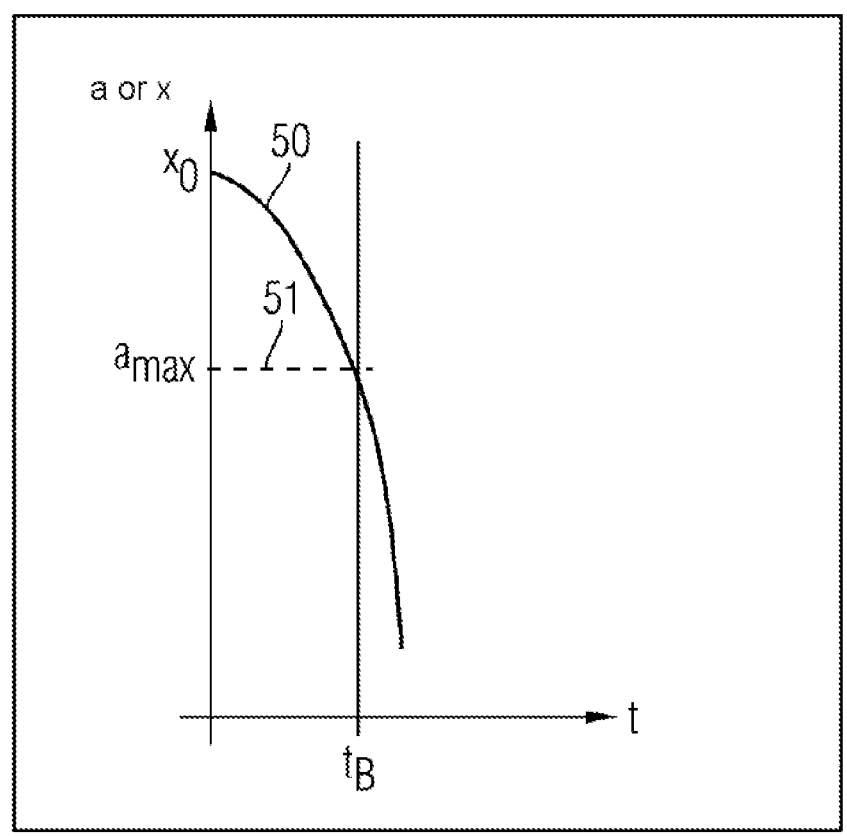
FIG. 5 shows an exemplary embodiment of a prescribed movement pattern.

The method according to embodiments of the invention, as portrayed in FIG. 1, is used to ensure that security-relevant information is erased in good time before the device is inoperable. In the initial state 10 of the method, there is security-relevant information in a device. This information may be stored in a security module, for example. In this case, method step 11 involves at least one movement parameter of the device being continuously ascertained over time. A movement parameter of this kind can denote the position of the device, the speed, the acceleration or perhaps the orientation of the device, for example. Therefore, a movement trajectory of the device is recorded, for example. A movement trajectory of this kind is a path curve in two-dimensional space, for example, as depicted in FIG. 5, or perhaps a space curve in a three-dimensional coordinate system, along which the center of gravity of the device or of the apparatus moves, for example. Besides the position or the point in space of the device, the speed or acceleration thereof or perhaps the orientation of the device can also be ascertained.

The movement parameters can be ascertained by the device. To this end, in one variant, crash sensors of the device can be used that, e.g. as a further function, trigger an airbag or belt tensioner. In another variant, the device contains a security module containing sensors independently of or in addition to sensors of the device. A security module of this kind has the advantage that it is integrable with little sophistication into a device, since it has the functionality according to embodiments of the invention as an integrated function.

Method step 12 now likewise involves the ascertained movement parameter being continuously monitored over time in comparison with at least one prescribed movement pattern. The prescribed movement pattern may in particular also be a movement trajectory of the device. In particular, prescribed movement trajectories may be consistent with a special mode of operation of the device, such as, for example, an emergency landing, an emergency stop or evasive action to limit damage in the event of an accident.

The prescribed movement patterns can extend over a period of different length. The period can be from one or a few milliseconds to several seconds or even minutes. By way of example, a movement pattern may be just a brief instance of a prescribed maximum speed being exceeded. A prescribed movement pattern may likewise be in a height profile or, by way of example, at a constant height above a surface, which means that an erase process for the security-relevant information is triggered in the event of a drop below this minimum height, see method step 13.

In this case, the erase process can, in addition, be made dependent on a prescribed threshold value being reached or exceeded at least for a prescribed period. This prevents brief fluctuations, possibly just due to random effects or measurement errors in sensors, from triggering the erase process and therefore, by way of example, important functions in the device not being able to continue being performed.

On the other hand, the prescribed period of concordance between the ascertained movement pattern and the prescribed movement pattern needs to be chosen such that enough time remains to be able to perform and complete the erase process fully.

In one variant, a movement parameter of a medium surrounding the device can also be ascertained. By way of example, the flow rate of air above the surface of the device or portions of the device can be measured and compared with a prescribed movement trajectory of the medium. Equally, the pressure on the surface of the device can be measured, for example. In this case, one or more sensors, for example at different points on or above the surface of the device or perhaps inside the device, can be used to detect movement parameters.

Figure 2:
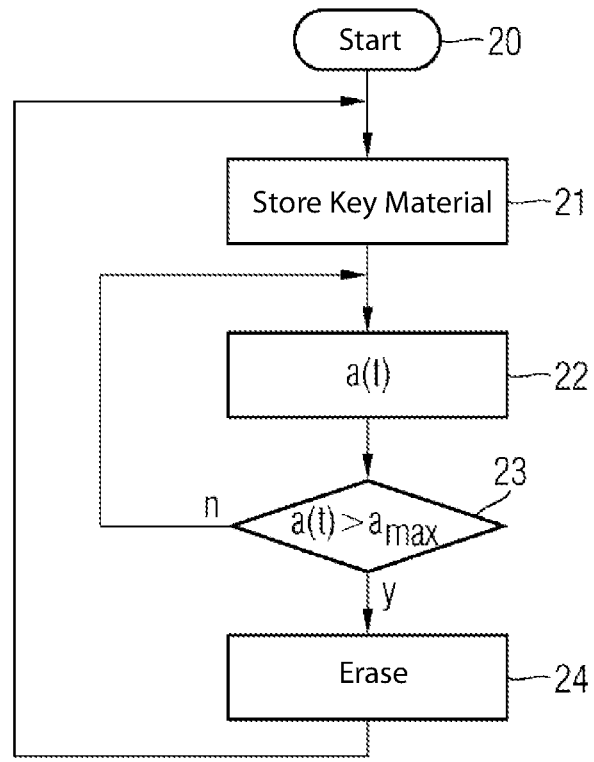
FIG. 2 shows a second exemplary embodiment of the method as a flowchart.

FIG. 2 depicts the sequence of the method using the example of monitoring the acceleration of a device. The starting point for the method is the state 20, in which a device having a security module, for example, has an acceleration sensor or an inertial sensor that measures the acceleration of the device and in particular of the security module continuously or at prescribed intervals of time. In the security module, cryptographic key materials for different applications of the device are produced, for example. Method step 21 involves a key material of this kind or perhaps any other security-relevant information being stored. Method step 22 involves the acceleration of the device or perhaps specifically of the security module being determined. Method step 23 now involves the ascertained acceleration being compared with a prescribed maximum acceleration value, for example. If the ascertained acceleration over a prescribed period is greater than a prescribed maximum acceleration value, method step 24 subsequently involves the erasure of a key memory and hence of all security-relevant information stored in the apparatus or in a device being triggered. This is denoted by the arrow that leads to method step 21. The erase process is then executed as method step 21 instead of the storage of key material. If the acceleration a(t) measured at the time t is lower than the prescribed maximum value $a_{max}$, then just further detection of the acceleration is prompted. This is denoted by the arrow from method step 23 to method step 22.

The monitoring of the measured movement parameters is in particular also performed over a period of time and erasure of the security-relevant information is triggered only when the resultant time profile of the detected movement parameter is consistent with a prescribed movement pattern or with an applicable movement trajectory or with a prescribed profile of the movement parameter or differs from the prescribed movement pattern or movement trajectory.

Figure 3:
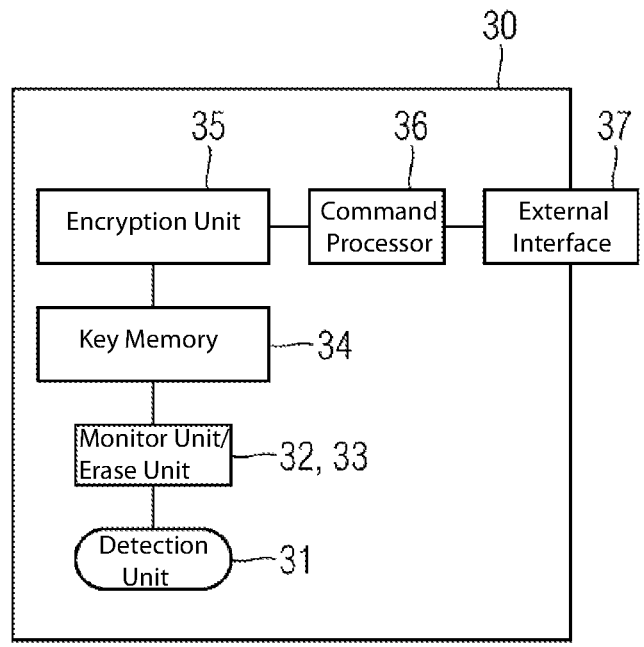
FIG. 3 shows an exemplary embodiment of an apparatus in a block diagram.

FIG. 3 shows an apparatus for erasing security-relevant information in a device. The apparatus comprises a detection unit 31. The detection unit 31 can contain one or perhaps multiple sensors, for example an inertial sensor, which measures an acceleration or a rate of rotation of a body. Inertial sensors of this kind are used for aerial navigation in inertial navigation systems for use in vehicles or rockets, for example. The detection unit 31 may also be of multipart-design and disposed at different points in and on the device. By way of example, one or more position sensors or speed sensors may be mounted in or on the device 30 for detecting at least one movement parameter.

A monitoring unit 32 monitors a movement ascertained over time in comparison with a prescribed movement pattern and preferably records it. An erasure unit 33 triggers an erase process for the security-relevant information if prescribed criteria are met. The monitoring unit 32 and the erasure unit 33 are arranged in the apparatus 30 in a manner integrated in an impact detector, for example.

The apparatus 30 depicted in FIG. 3 is, by way of example, a security module having an external interface 37, for example, to a serial data bus based on the I2C standard, a USB standard, an RS232 standard or the SPI standard. Via the interface 37, the apparatus 30 is connectable e.g. to a field device, a controller, a satellite navigation receiver or a computer system. A command processor 36 executes received commands, such as, for example, for encrypting or decrypting data, for signing or checking a signature, for computing or checking a cryptographic check sum or perhaps for generating a cryptographic pseudorandom sequence.

To this end, the command processor 36 uses an encryption unit 35, also referred to as a crypto engine, that implements symmetric cryptographic algorithms, such as e.g. AES, asymmetric cryptographic methods, such as, for example, RSA, Diffie-Hellman Key Exchange or ECC, algorithms for digital signature, such as DSA or ECDSA, cryptographic hash functions, such as, for example, HMAC, or key derivation functions, such as, for example, KDF. Additionally, a key memory 34 is contained. The erasure unit 33 is connected to the key memory 34 and sends an erase command to the key memory 34, which prompts erasure of all of the security-relevant information therein.

The acceleration sensor 31 continuously ascertains the acceleration of the apparatus 30 or of a device 40 in which the apparatus 30 is arranged and therefore records a movement trajectory 50, as depicted by way of example in FIG. 5. By way of example, the movement trajectory 50 is consistent with a fall curve x(t) for an object falling from a height $x_0$ exclusively under the effect of gravity. If a corresponding movement pattern 50 is detected by the monitoring unit 32 over a period of $t_B$, for example, then the erasure unit 33 triggers the erase process. Accordingly, the erasure criterion monitored can be the reaching of a maximum acceleration, denoted in this case by $a_{max}$, over the prescribed period as a threshold value. A monitoring period $t_B$ is in this case chosen such that a prescribed movement pattern can also be reliably distinguished from a random unusual movement.

Figure 4:
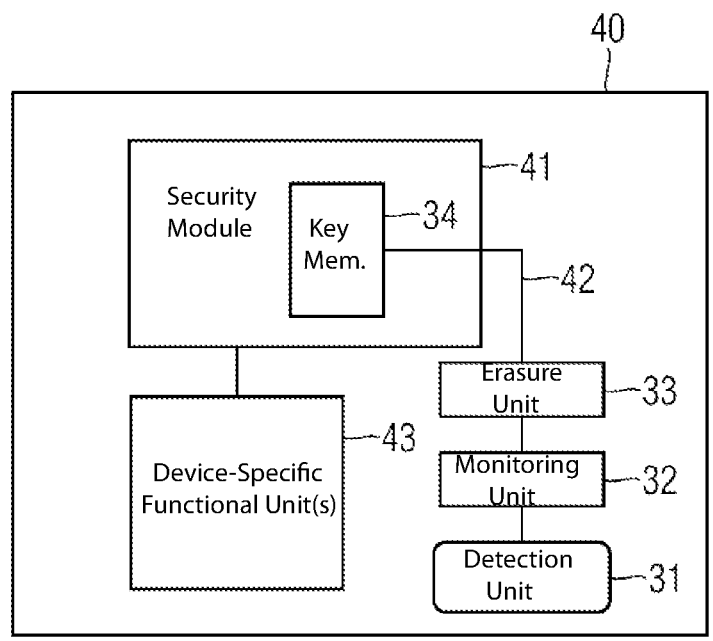
FIG. 4 shows an exemplary embodiment of a device with an apparatus in a block diagram.

FIG. 4 depicts a device 40 that contains an apparatus for erasing security-relevant information. By way of example, the device is a field device, a controller, a satellite navigation receiver or a computer system. Said devices are merely a selection of devices into which the apparatus is integrable. The device 40 has device-specific functional units 43 and, by way of example, a security module 41 in which the key memory 34 is contained. A detection unit 31 comprising one or more sensors for detecting at least one movement parameter is connected to a monitoring unit 32 that compares the detected movement parameters recorded over time with one or more prescribed movement patterns and, in the event of a threshold value being exceeded or in the event of concordance with a prescribed movement pattern, prompts the erasure unit 33 to send an erase signal to the key memory 34 in the security module 41 via the interface 42, for example.

The apparatus for erasing security-relevant information may therefore be integrated in a device in different ways. The individual units of the apparatus may all be implemented in a security module, as shown in FIG. 3, or else in a manner distributed in a device, as shown in FIG. 4, for example. The function blocks depicted may be realized in hardware-based or as software-based functions. By way of example, the apparatus 30 may be designed as a security chip or crypto controller with an integrated MEMS (microelectronic mechanical system) sensor as acceleration sensor and an integrated crash detector that forms the monitoring unit 32. By way of example, the device 40 can comprise a field device having an MEMS acceleration sensor that carries out automatic erasure of key material if the detected acceleration exceeds a prescribed threshold value for a prescribed time.

Although the invention has been illustrated and described in greater detail with reference to the preferred exemplary embodiment, the invention is not limited to the examples disclosed, and further variations can be inferred by a person skilled in the art, without departing from the scope of protection of the invention.

For the sake of clarity, it is to be understood that the use of "a" or "an" throughout this application does not exclude a plurality, and "comprising" does not exclude other steps or elements.

The invention claimed is:

1. A method for erasing security-relevant information in a device, the method comprising:
    continuously ascertaining at least one movement parameter of the device over time;
    continuously monitoring the at least one ascertained movement parameter over time on a basis of at least one prescribed movement pattern, wherein the at least one prescribed movement pattern is a movement trajectory of the device that denotes a special mode of operation of the device; and
    triggering an erase process for the security-relevant information if the at least one ascertained movement parameter over time is consistent with the at least one prescribed movement pattern, wherein the erase process is triggered if the at least one ascertained movement parameter is consistent with the at least one prescribed movement pattern at least for a prescribed period that is chosen such that the at least one prescribed movement pattern is distinguished from a random unusual movement.

2. The method as claimed in claim 1, wherein the at least one ascertained movement parameter is a position, a speed, an acceleration or an orientation of the device.

3. The method as claimed in claim 1, wherein the erase process is triggered if the at least one ascertained movement parameter is consistent with the at least one prescribed movement pattern with a predetermined accuracy.

4. The method as claimed in claim 1, wherein the special mode of operation of the device includes an emergency landing, an emergency stop, an evasive action to limit damage in an event of an accident, or a free fall event.

5. The method as claimed in claim 1, wherein the at least one ascertained movement parameter of a medium surrounding the device is ascertained.

6. The method as claimed in claim 1, wherein the movement trajectory is consistent with a fall curve x(t) for an object falling from a height $x_0$ exclusively under an effect of gravity for the prescribed period.

7. The method of claim 1, wherein the erase process is triggered if a maximum acceleration of the device is reached over the prescribed period as a threshold value.

8. An apparatus for erasing security-relevant information in a device, the apparatus comprising:
    a detection unit configured to continuously ascertain at least one movement parameter of the device;
    a monitoring unit configured to continuously monitor the at least one ascertained movement parameter over time on a basis of at least one prescribed movement pattern, wherein the at least one prescribed movement pattern is a movement trajectory of the device that denotes a special mode of operation of the device; and
    an erasure unit configured to trigger an erase process for the security-relevant information if the at least one ascertained movement parameter over time is consistent with the at least one prescribed movement pattern, wherein the erase process is triggered if the at least one ascertained movement parameter is consistent with the at least one prescribed movement pattern at least for a prescribed period that is chosen such that the at least one prescribed movement pattern is distinguished from a random unusual movement.

9. The apparatus as claimed in claim 8, wherein the detection unit has at least one sensor, an acceleration sensor, a magnetic field sensor or a position sensor, that ascertains the at least one ascertained movement parameter.

10. The apparatus as claimed in claim 8, wherein at least the erasure unit is directly connectable to a security module storing security-relevant information.

11. A device comprising the apparatus as claimed in claim 8, wherein the device is a mobile device, or the device is installed at a fixed location.

12. A computer program product, comprising a computer readable storage medium having computer readable program code stored therein, said program code executable by a processor of a computer system to implement the method as claimed in claim 1.

13. A data storage medium storing the computer program product as claimed in claim 12.

\* \* \* \* \*